(12) United States Patent
Sugimoto (10) Patent No.: US 7,511,844 B2
(45) Date of Patent: Mar. 31, 2009

(54) IMAGE FORMING DEVICE AND IMAGE FORMING METHOD

(75) Inventor: Tasuku Sugimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 944 days.

(21) Appl. No.: 10/667,503

(22) Filed: Sep. 23, 2003

(65) Prior Publication Data

US 2004/0064792 A1    Apr. 1, 2004

(30) Foreign Application Priority Data

Sep. 30, 2002    (JP) .............................. 2002-285416

(51) Int. Cl.
*G06F 17/00*    (2006.01)
(52) U.S. Cl. ....................... 358/1.15; 715/526; 358/539
(58) Field of Classification Search ................ 358/1.15, 358/468, 1.9, 1.16, 1.1, 1.18, 296, 1.14, 444, 358/1.12; 715/526; 382/245
See application file for complete search history.

(56) References Cited

U.S. PATENT DOCUMENTS

| | | | | |
|---|---|---|---|---|
| 5,689,589 | A * | 11/1997 | Gormish et al. ............. | 382/239 |
| 6,094,510 | A | 7/2000 | Yaguchi et al. | |
| 6,181,435 | B1 * | 1/2001 | Onodera .................... | 358/1.14 |
| 6,646,756 | B2 * | 11/2003 | Moriyama et al. .......... | 358/1.15 |
| 6,961,139 | B1 * | 11/2005 | Kita et al. .................. | 358/1.15 |
| 7,072,058 | B1 * | 7/2006 | Miyazaki et al. ........... | 358/1.15 |
| 7,271,923 | B1 * | 9/2007 | Wakana ...................... | 358/1.13 |
| 2001/0007595 | A1 * | 7/2001 | Mishima ..................... | 382/232 |
| 2002/0071138 | A1 * | 6/2002 | Ohara ........................ | 358/1.15 |
| 2002/0126311 | A1 * | 9/2002 | Tanaka ....................... | 358/1.15 |
| 2003/0063813 | A1 * | 4/2003 | Shiraishi .................... | 382/245 |

FOREIGN PATENT DOCUMENTS

| | | |
|---|---|---|
| JP | A-4-156766 | 5/1992 |
| JP | A-6-316118 | 11/1994 |
| JP | A-9-284539 | 10/1997 |
| JP | A-2000-339110 | 12/2000 |

* cited by examiner

*Primary Examiner*—King Y Poon
*Assistant Examiner*—Allen H Nguyen
(74) *Attorney, Agent, or Firm*—Oliff & Berridge, PLC (57) ABSTRACT

Image forming device and image forming method providing at least two printing speed of a printing engine dependent on data volume of a raster. Printing data transmitted from a host computer are stored in RAM and developed into image data by CPU. The image data are compressed by ASIC and stored in the RAM. The CPU determines if the compressed image data can be printed at a high printing speed by comparing a predetermined data volume with the compressed data volume of the raster having the largest data volume (the greatest raster length) among rasters constituting the image data. High speed printing is selected for the laser units if determination falls that high speed printing is feasible, whereas low speed printing is selected for the laser units if high speed printing is not feasible. Then, the compressed image data are sent to the ASIC on a raster by raster basis and transferred to the laser units for printing after having been decompressed.

19 Claims, 6 Drawing Sheets

IMAGE FORMING DEVICE AND IMAGE FORMING METHOD

BACKGROUND OF THE INVENTION

The present invention relates to an image forming device and an image forming method. More particularly, the present invention relates to an image forming device and an image forming method by which image data are transferred to a recording engine after the image data having been compressed and decompressed.

In laser printers, the laser beam modulated according to the image data is made to irradiate a polygon mirror that is driven to rotate at constant rate and the laser beam reflected from the polygon mirror is made to raster-scan a photosensitive body to form an electrostatic latent image on the photosensitive body. Therefore, it is necessary to supply image data that correspond to a raster to the laser scanner unit (to be referred to simply as "laser unit" hereinafter) disposed in the laser engine, that is a recording engine of the laser printer, in synchronism with the rotary motion of the polygon mirror that is rotated at a rate determined as a function of the printing speed (the number of sheets printed in a unit time) and the resolution (the number of dots printed on a unit length) within a predetermined period of time (printing time for a raster).

In recent years, the amount of data that needs to be supplied to the laser unit within a unit time has been remarkably increased for the purpose of realizing color printing and high speed printing. However, it is not possible to transfer the image data stored in the RAM (memory) to some other part at a sufficiently high rate because of the restrictions imposed on the bus width and the bus cycle of the RAM arranged on the main substrate of the laser printer, which is adapted to receive printing data (original data) from the host computer, convert them into image data and subsequently supply them to the laser unit. Therefore, unless the RAM is replaced by some other one that affords a greater bus width and a shorter bus cycle and hence is more costly, it is no longer possible to supply image data by the amount required for the laser unit from the main substrate to the laser unit within the time for printing a raster. Then, the laser printer can become overloaded. To avoid this problem, there has been proposed a technique with which the image data are compressed before they are stored in the RAM and transferred to some other part (e.g., ASIC (application specific integrated circuit) and subsequently the compressed image data are decompressed (expanded) so that the decompressed image data are supplied to the laser unit.

However, the amount of data that can be reduced by compression can vary depending on the entropy of the data. Therefore, when a relatively high constant speed is defined for printing, assuming that a good and high compression ratio can be put to use, there can arise a situation where it is no longer possible to supply data by the required amount to the laser unit within the period of time for printing a raster unless a costly RAM that affords a greater bus width and a shorter bus cycle is employed if the image data to be used for printing has not been compressed to a high compression ratio. Then, the laser printer can become overloaded, i.e., print overrun occurs. On the other hand, when a relatively low constant speed is set for printing, assuming that only a poor and low compression ratio can be put to use, there can arise a situation where a low printing speed is in place and the printing engine is not exploited to perform highly, although image data can be compressed to a high compression ratio to realize a high speed printing operation.

Japanese Patent Application Laid-Open Publication No. 6-316118 describes a technique for performing a efficient printing when the data of a page (the intermediate codes generated from the printing data) are divided into a plurality of bands and the data are processed on a band by band basis in a laser printer. According to the technique, the printing speed is lowered when the maximum amount of information of a band is too large, since a prolonged time period is required for developing data from a display list memory storing the divided intermediate codes into a page data memory storing the intermediate codes of one page. On the other hand, the printing speed is raised when the maximum amount of information of a band is not very large, because developing data from the display list memory to the page data memory is not time consuming. The disclosed technique is designed to regulate the printing speed according to the time period required for developing the intermediate codes that are divided into a plurality of bands into data of one page in a step preceding the step of compressing image data. The disclosed technique does not concern the compressed image data transmission efficiency from a RAM, the image data having been converted from the intermediate codes and have been compressed.

SUMMARY OF THE INVENTION

It is therefore an object of the present invention to provide a low cost image forming device and an image forming method that do not give rise to an overloaded condition when the image data to be used for printing cannot be compressed to a high compression ratio and capable of performing high speed image formation when the image data to be printed can be compressed to a high compression ratio.

This and other object of the present invention will be attained by an image forming device including image data generation means, compression means, memory means, printing engine, a determining means, decompressing means, and transfer means. The image data generation means is adapted for generating image data from original data. The compression means is adapted for compressing the image data generated by the image data generation means. The memory means is adapted for storing the image data compressed by the compression means. The a printing engine provides a plurality of different printing speed for printing an image on an image recording medium. The determining means is adapted for determining the printing speed based on an amount of the compressed image data stored in the memory means. The decompressing means is adapted for decompressing the compressed image data stored in the memory means. The transfer means is adapted for transferring the image data decompressed by the decompressing means to the printing engine.

In another aspect of the invention, there is provided an image forming device including the image data generation means, the compression means, the printing engine, the memory means, the decompressing means, the transfer means, and a printing speed determining means. The printing speed determining means is adapted for predicting compressed data volume based on the image data generated by the image data generation means and selecting one of the printing speed among the plurality of different printing speed based on the predicted compressed data volume.

DETAILED DESCRIPTION OF THE PREFERRED EMBODIMENTS

An image forming device according to a first embodiment of the present invention will be described with reference to FIGS. 1 through 5.

Figure 1:
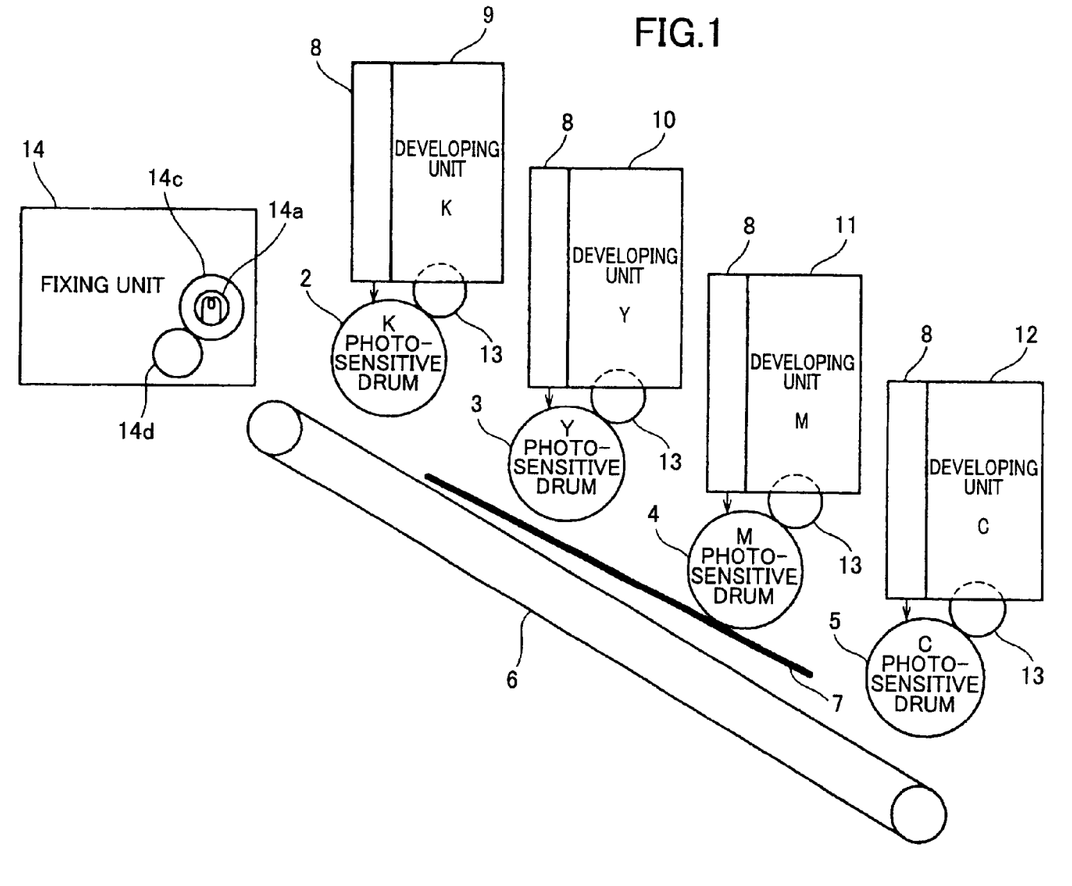
FIG. 1 is a schematic illustration showing a laser printer as an image forming device according to a first embodiment of the present invention.

FIG. 1 is a schematic illustration of a color laser printer according to the first embodiment. The color laser printer 1 shown in FIG. 1 is of the so-called "tandem type", in which four laser engines are arranged in series. More specifically, four photosensitive drums 2, 3, 4 and 5 provided respectively for four different colors of black (K), yellow (Y), magenta (M) and cyan (C) are arranged along the conveyance route of sheets of paper 7, or recording mediums, that are conveyed on conveyor belt (conveyance section) 6. A laser unit (exposure section) 8 is arranged on each of the four photosensitive drums 2, 3, 4 and 5. Each of the laser units 8 is adapted to emit a laser beam for forming a pattern that is a reversal of the pattern of the image data of the related color, which may be K, Y, M or C, modulating the intensity of light. Developing units (developing sections) 9, 10, 11 and 12 for containing respective toners of K, Y, M and C are also arranged on the respective photosensitive drums 2, 3, 4 and 5. Toners are applied from the developing units 9, 10, 11 and 12 to the respective photosensitive drums 2, 3, 4, 5 through respective developing rollers 13 arranged under the developing units.

A fixing unit 14 is disposed at a position downstream of the plurality of laser units 2 through 5. The fixing unit 14 includes a heating roller 14c, a pressure roller 14d and a halogen heater lamp 14a disposed in the heating roller 14c.

Note that, in the laser printer 1 of this embodiment, each of the four laser engines is adapted to selectively operate for printing at "high speed" or at "low speed" that is lower than the high speed. In this embodiment, the "high" printing speed implies a printing speed demanded by a user at a laser engine or the highest printing speed of the laser engine.

Each of the photosensitive drums 2, 3, 4 and 5 is electrically charged in advance by means of a high voltage source 31 (see FIG. 2) and exposed to the laser beam that is emitted from the corresponding laser unit 8 and whose intensity is appropriately modulated. The image data supplied to the laser unit 8 are generated as raster data, when the original printing data supplied from the host computer, which will be described hereinafter, are processed by the CPU 41 (see FIG. 3) in the main substrate 22 (see FIG. 2). The laser units 8 may be replaced by LED arrays.

As the photosensitive drums 2, 3, 4 and 5 are irradiated with the respective laser beams, the surface areas of the photosensitive drums 2, 3, 4 and 5 that are exposed to a laser beam are de-electrified so that desired electrostatic latent images are formed respectively on the photosensitive drums 2, 3, 4 and 5. The surface areas of the photosensitive drums 2, 3, 4 and 5 that are irradiated with the respective laser beams electrostatically adsorb respective toners of the corresponding colors as they are supplied from the respective developing units 9, 10, 11 and 12. The toners of the different colors adsorbed to the respective photosensitive drums 2, 3, 4 and 5 are sequentially transferred onto a sheet of paper 7 in the order of C, M, Y and K as the sheet of paper 7 is conveyed on the conveyor belt 6 because these toners are subjected to electrostatic force that is directed to the conveyor belt 6.

Thereafter, the sheet of paper 7 onto which the toners of the four colors of C, M, Y and K have been transferred in an overlapping manner is led into the fixing unit 14. In the fixing unit 14, the toners are molten at high temperature by means of the halogen heater lamp 14a and the toner image is fixed to the sheet of paper 7 as the latter is pinched and pressed between the heating roller 14c and the pressure roller 14d.

Thus, color printing is realized as image data of four colors of K, Y, M and C are used in the laser printer 1 of this embodiment. Additionally, since the laser printer 1 is of the tandem type, in which four photosensitive drums 2, 3, 4 and 5 are arranged in series along the conveyance route of the sheet of paper 7, print images can be formed at high speed in comparison with a laser printer of the type having only a single photosensitive drum.

Figure 2:
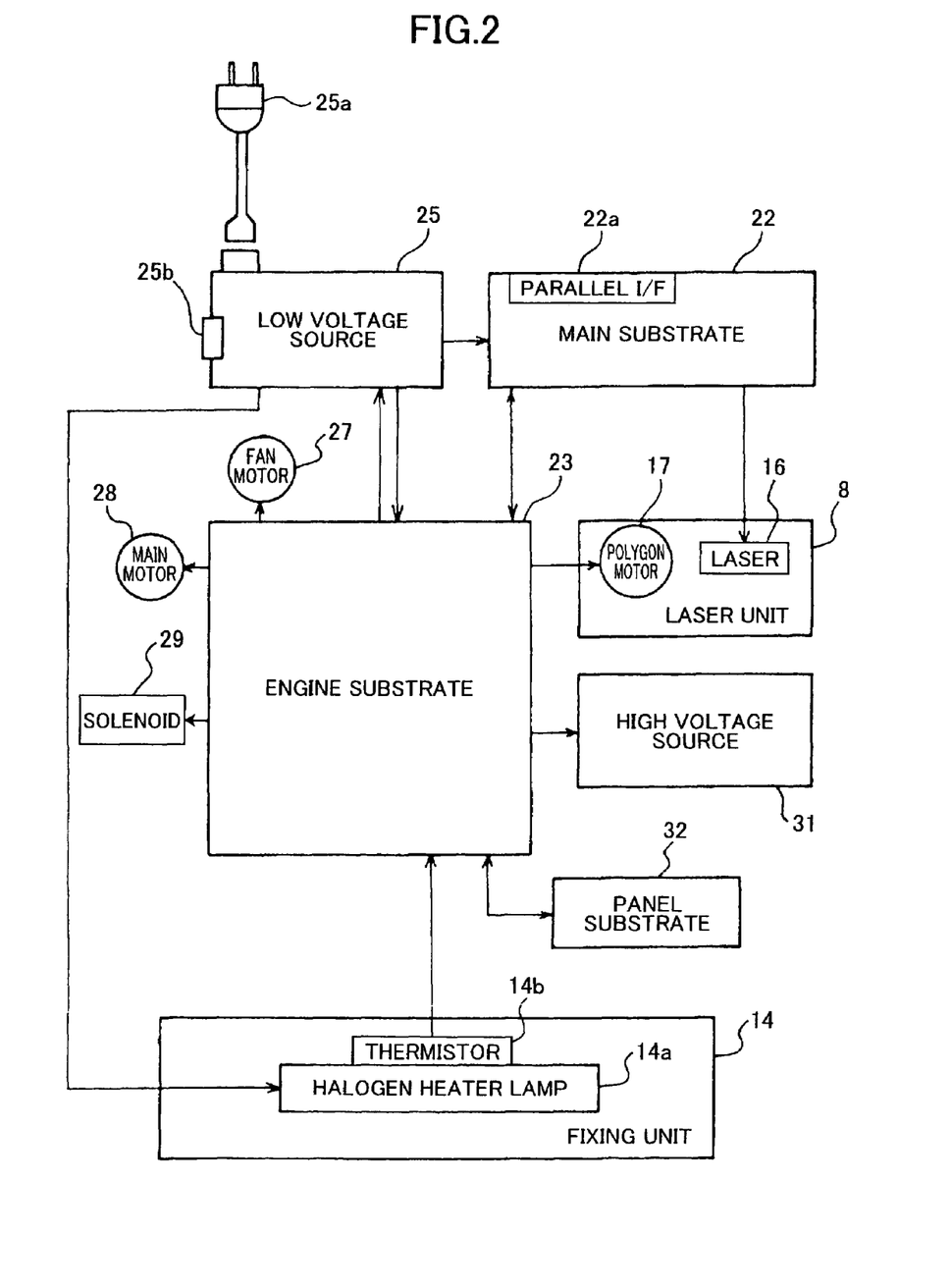
FIG. 2 is a schematic block diagram of the laser printer of FIG. 1.

Now, the laser printer 1 of this embodiment will be described further by referring to the block diagram of FIG. 2. As shown in FIG. 2, the laser printer 1 includes a main substrate 22 and an engine substrate 23. The main substrate 22 is adapted to convert printing data into image data and output the latter to the laser units 8, while generating various instructions to the engine substrate 23. The engine substrate 23 is adapted to control various components of the laser printer 1 including the laser units 8 according to the instructions issued from the main substrate 22. DC voltage is applied to the main substrate 22 and also to the engine substrate 23 from a low voltage source 25 that is connected to an AC power source by way of a power supply plug 25a when the switch 25b of the low voltage source 25 is turned on. The low voltage source 25 also applies AC voltage to the halogen heater lamp 14a in the fixing unit 14 when its switch 25b is turned on.

The main substrate 22 is provided with a parallel interface (I/F) 22a for connecting to the host computer (not shown) Thus, the main substrate 22 receives printing data expressed in a page describing language from the host computer by way of the parallel I/F 22a and develops the received printing data into intermediate codes and then further into image data of a raster data format for each of the four colors of C, M, Y and K. For example, the main substrate 22 develops the received printing data into intermediate codes and then further into image data on a page by page basis. The obtained image data of each of the four colors are supplied to a laser beam source 16 arranged in the laser unit 8 of that color. Note that only one of the four laser units 8 is shown in FIG. 2 for the purpose of simplicity. It may alternatively be so arranged that the laser printer 1 includes only a single laser unit 8 that is adapted to emit laser beams to the respective photosensitive drums 2, 3, 4 and 5.

A semiconductor laser is employed as the laser beam source that emits a laser beam whose intensity is modulated according to the image data applied from the main substrate 22. Alternatively, a solid laser and an intensity modulating element is available as the laser beam source 16 in place of the semiconductor laser. The modulated laser beam emitted from the laser source 16 is reflected by a polygon mirror (not shown) that is driven to rotate at a constant rate by a polygon motor 17 and then made to pass through an fè lens (not shown) so as to convert a constant angular velocity movement (not shown) in order to convert constant angular velocity movement into a constant linear velocity movement before the laser beam is irradiated onto the corresponding one of the photosensitive drums 2, 3, 4 and 5 for raster-scanning. Therefore, the laser unit 8 needs to be supplied with image data from the main substrate 22 in synchronism with the rotary motion of the polygon mirror in such a way that one of the sides of the polygon mirror corresponds to a raster of the image data. In this way, electrostatic latent images of the four colors are formed respectively on the photosensitive drums 2, 3, 4 and 5 for the desired image to be obtained.

The engine substrate 23 is connected to the fixing unit 14 and to the laser units 8 as well as to a fan motor 27, a main motor 28, a solenoid 29, a high voltage source 31, and a panel substrate 32. The fan motor 27 is adapted for driving a fan to turn in order to cool the inside of the laser printer 1. The main motor 28 is adapted for conveying the sheet of paper 7 and driving the photosensitive drums 2, 3, 4 and 5. The solenoid 29 is adapted for picking up the sheet of paper 7. The high voltage source 31 is adapted for generating a high voltage to be used for electrically charging the photosensitive drums 2, 3, 4 and 5. The panel substrate 32 is adapted for controlling the display operation of a display panel (not shown). Thus, the engine substrate 23 drives the polygon motor 17, the fan motor 27, the main motor 28, the solenoid 29 and the high voltage source 31 at respective appropriate timings according to the instructions received from the main substrate 22 and transmits control signals to the panel substrate 32 at appropriate timings. Additionally, the engine substrate 23 receives signals from a thermistor 14*b* that measures the temperature of the halogen heater lamp 14*a* arranged in the fixing unit 14 and controls the low voltage source 25 in such a way that the halogen heater lamp 14*a* is held to a constant temperature level.

Figure 3:
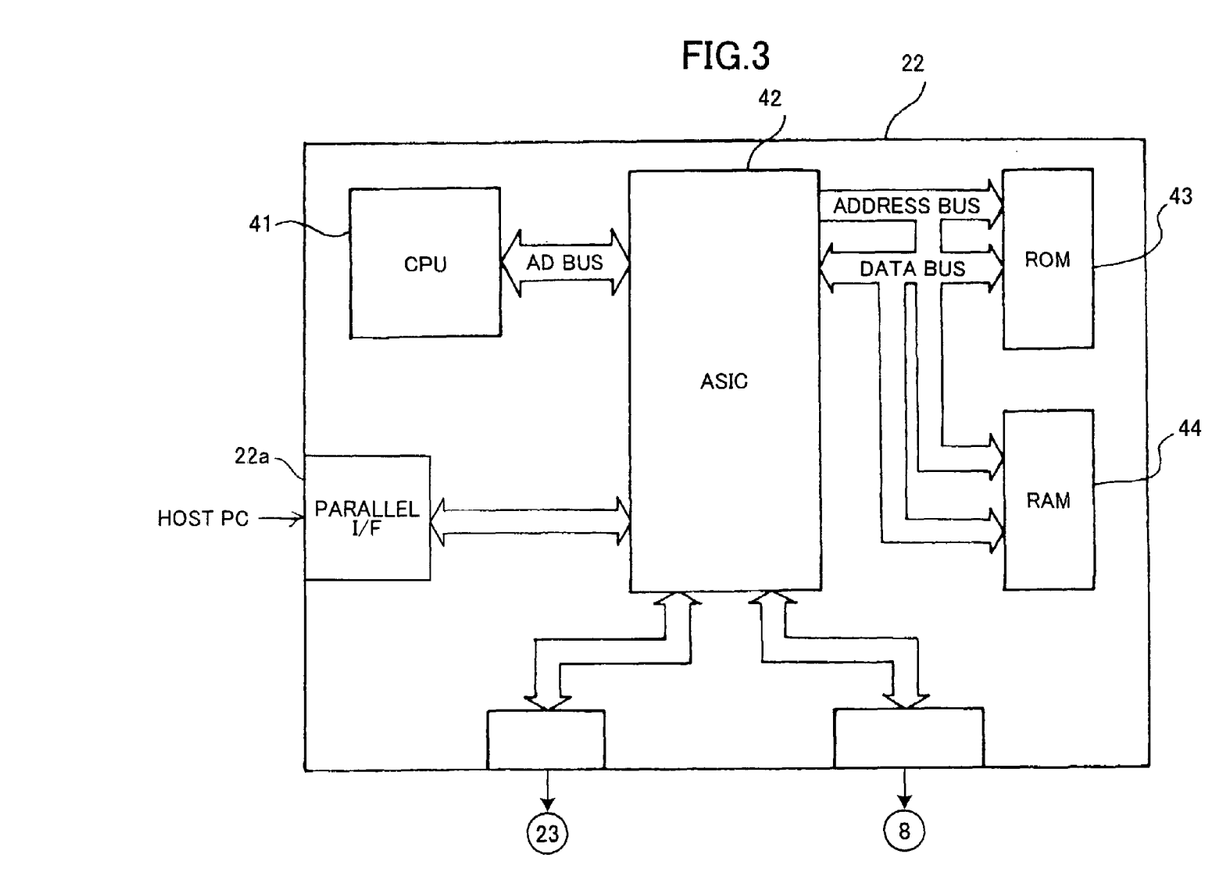
FIG. 3 is a schematic block diagram of a main substrate shown in FIG. 2.
Figure 4:
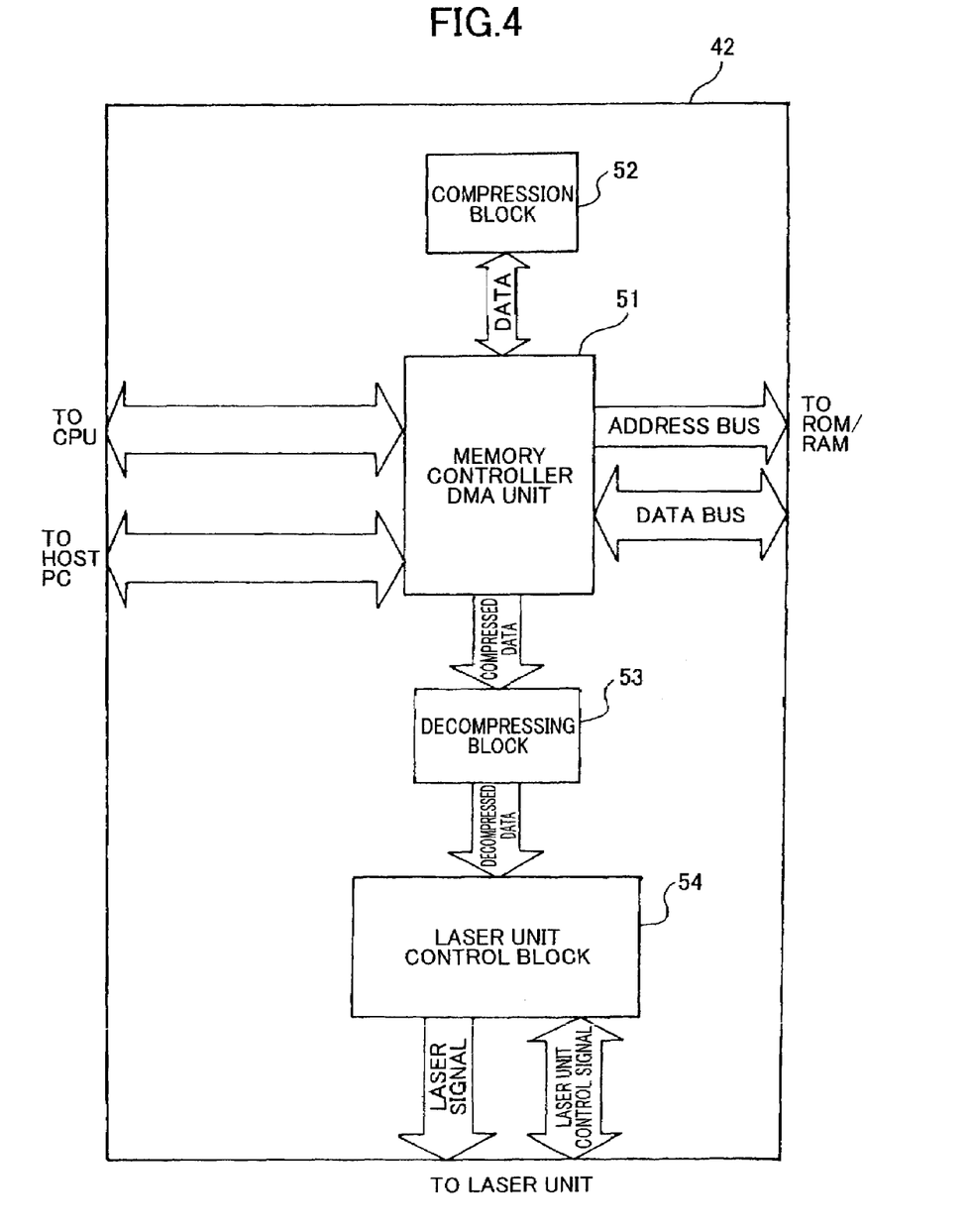
FIG. 4 is a schematic block diagram for description of image processing operation executed in ASIC in the main substrate.

Now, the data processing operation executed in the main substrate 22 of FIG. 2 will be described further by referring to FIGS. 3 and 4. FIG. 3 is a schematic block diagram showing the main substrate 22, and FIG. 4 is a schematic block diagram for description of image processing operation executed in ASIC 42 in the main substrate 22.

As shown in FIG. 3, CPU 41, ASIC 42, ROM 43 and RAM 44 are arranged on the main substrate 22 and connected to each other by way of an address bus and a data bus. The ROM 43 stores various programs and data that are to be used for controlling the operation of the laser printer 1. The CPU 41 performs various arithmetic operations on the basis of the programs stored in the ROM 43. More specifically, in this embodiment, the CPU 41 develops printing data into intermediate codes and also develops intermediate codes into image data by means of band processing. In other words, the CPU 41 functions as image data generating means.

The RAM 44 stores the outcomes of various arithmetic operations of the CPU 41 and those of the ASIC 42, the printing data transmitted from the host computer and the intermediate codes produced by the CPU 41 as well as the image data generated by the CPU 41. In short, the RAM 44 functions as memory means. The ASIC 42 operates for exchanging data between the CPU 41 and the RAM 44 and also for processing operations such as compressing and decompressing image data.

In this embodiment, the CPU 41 determines the printing speed of the laser engines that include the respective laser units 8 on a page by page basis by referring to the raster (having the greatest raster length) that maximizes the data volume out of all the rasters constituting the compressed image data of a page that has been compressed by the ASIC 42 and stored in the RAM 44. More specifically, the CPU 41 determines whether or not the raster (having the greatest raster length) that maximizes the data volume out of all the rasters constituting the compressed image data of a page exceeds a predetermined data volume or length, and the CPU 41 selects "low speed" for the printing speed of the laser engines for the given image data if the raster (having the greatest raster length) that maximizes the data volume exceeds a predetermined data volume. On the other hand, CPU 41 selects "high speed" for the printing speed of the laser engines for the given image data if the raster (having the greatest raster length) that maximizes the data volume does not exceed a predetermined data volume. Differently stated, the CPU 41 functions as printing speed determining means. The above described predetermined length is determined on the basis of the data volume that can be transferred from the RAM 44 to the ASIC 42 within the printing time period within which one raster printing can be performed based on "high" printing speed and the resolution of the laser engines.

Further, the CPU 41 reads out the image data that have been compressed by the ASIC 42 and stored in the RAM 44 at an appropriate data transfer cycle based on the printing speed as determined in a manner as described above. The image data read out from the RAM 44 are decompressed by the ASIC 42 and subsequently sent to the laser units 8.

Furthermore, the CPU 41 generates various instructions in such a way that the main motor 28, the solenoid 29, the polygon motor 17 and so on operate respectively at appropriate timings based on the printing speed as determined in a manner as described above. The instructions generated by the CPU 41 are sent to the engine substrate 28 by way of the ASIC 42. As a result, the four laser engines operate for printing at the printing speed determined by the CPU 41.

As shown in FIG. 4, the ASIC 42 includes a memory controller 51, a compression block 52, decompressing block 53 and a laser unit control block 54. The memory controller 51 includes a DMA (direct memory access) unit and controls the operation of data transfer to the CPU 41 and the host computer and, to the ROM 43, RAM 44, the compression block 52 and the decompressing block 53 without intervention of the CPU 41.

The compression block 52 compresses the image data generated by the CPU 41 by means of run length coding, prediction coding or JBIG (Joint Bi-level Image Experts Group) coding in the case of binary-coded images and by means of bit plane conversion, prediction coding, block sorting (BWT (Burrows-Wheeler Transform)), JPEG (Joint Photographic Experts Group) using a non-reversible compression DCT (Discrete Cosine Transformation) method or wavelet conversion in the case of multilevel-value-coded images. In the case of multilevel-value-coded images, image data are compressed by way of a two-step process including (1) a step of modeling the image data, in which the image data are converted into a different series of signals for the purpose of facilitating image compression, and (2) a step of entropy coding, in which codes are assigned to the series of signals obtained by the conversion of the step (1) so as to minimize the length of the code. Thus, the compression block 52 operates as compression means.

The decompressing block 53 decompress (expands) the image data that have been compressed by the compression block 52 so that it operates as decompressing means. The image data restored as a result of the decompressing process are then sent to the laser unit control block 54. The laser unit control block 54 serially transmits the image data as laser signals to the laser units 8 in synchronism with the rotary motion of the polygon mirror in a manner as described above, through exchanging laser unit control signals with respect to the laser units 8. Thus, the laser unit control block 54 operates as transfer means.

Figure 5:
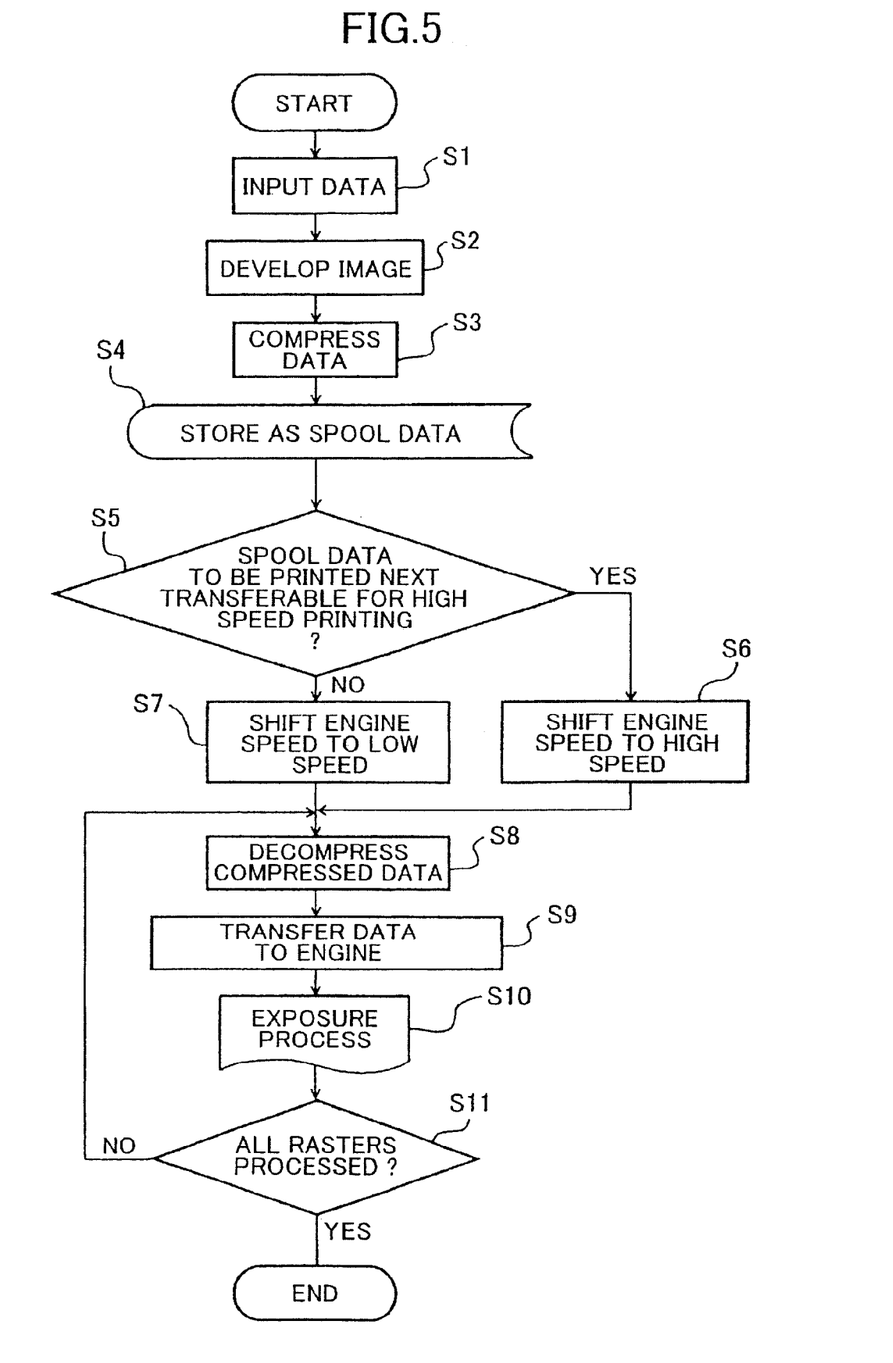
FIG. 5 is a flow chart for description of operation of the laser printer of FIG. 1.

Next, the operation of the laser printer 1 according to the first embodiment will be described by referring to the flowchart of FIG. 5. First, in Step S1, printing data are transmitted from the host computer to the main substrate 22 by way of the parallel I/F 22a. Then, the printing data are given to the ASIC 42 and stored in the RAM 44 by the memory controller 51.

Then, in Step S2, the printing data stored in the RAM 44 are developed into image data of a raster data format. More specifically, the CPU 41 sequentially reads the printing data stored in the RAM 44 and develops the printing data of a page into intermediate codes that are divided into a plurality of bands. The intermediate codes obtained by the developing operation are then sequentially stored in the RAM 44. As the intermediate codes of a page have been stored in the RAM 44, the CPU 41 reads the intermediate codes stored in the RAM 44 and develops them into image data of a raster data (bit map) format by means of a band processing operation. For instance, intermediate codes are developed into multilevel-value image data (dot data) such as 8-bit data.

Subsequently, in Step S3, the image data obtained by the developing operation with the CPU 41 are compressed in the compression block 52 of the ASIC 42 by means of the above described compression technique. The CPU 41 may alternatively conduct the operation of compressing the image data. In the latter case, the ASIC 42 may be downsized and its cost may be reduced, although the processing operation may become slower to some extent. In Step S4, the compressed image data are stored in the RAM 44 as SPOOL (simultaneous peripheral operation on-line) data.

Thereafter, in Step S5, determination is made as to whether or not the spool data to be used for the next printing operation can be printed at high speed. In other words, CPU 41 determines whether or not all the rasters of the spool data of a page that are stored in the RAM 44 so as to be used for the next printing operation can be transferred from the RAM 44 to the ASIC 42 in synchronism with the rotary motion of the polygon mirror rotated in agreement with the high speed printing.

This determining operation will be described in detail assuming that a letter-size sheet of paper (8.5 in. in width×11 in. in length) is to be used for a printing operation with a requested (initial) printing speed of 32 ppm (page/min). This required printing speed implies high printing speed.

Firstly, in view of the requested printing speed of 32 ppm, one page printing must be performed at a speed of 60 sec/32 ppm=1.875 sec. If the gap separating two consecutive sheets of paper is 4 in. in a continuous printing operation, sheets of paper needs to be moved at a rate of (11 in.+4 in.)/1.875 sec=8 in./sec. If the resolution is 600 dpi (dots/in.), it takes (1/600) in./8 in./sec=208.3 ìsec to move a sheet of paper for one printing line (for one raster). In other words, image data need to be sent to the laser units 8 at a cycle of 208.3 ìsec. In this way, the time period required for printing one raster is determined with a function of the printing speed and the resolution.

If the sheet of paper that is 8.5 inches wide is provided with lateral printing margins of 0.25 in., the maximum printing width will be 8 in. Therefore, if the data gradation level is 8 bits, the largest data volume of one raster will be 8 in.×600 dpi×8 bits/dot=38,400 bits. In this way, the data volume of a raster of image data prior to compression is determined with the function of the raster length, the resolution and the gradation level of image data.

In the case of this example, the question of whether or not the spool data can be printed at high speed depends on the question of whether or not all the rasters of the spool data of a page (the compressed data volume of each raster is determined with the function of the rate of compression image data, the raster length, the resolution and the gradation level) can be transferred from the RAM 44 to the ASIC 42 within 208.3 ìsec.

In this embodiment, comparison of raster length with the predetermined length is not performed on a raster by raster basis with respect to the all raster contained in the spool data of one page. Rather, the data volume of one raster having the largest compressed data volume in one page to be printed, i.e., the greatest raster length is compared with the predetermined length, i.e., the transferable data volume that can be transferred from the RAM 44 to the ASIC 42 within the one raster printing period which is determined with the function of the bus width and the bus cycle of the RAM 44 in order to see whether or not each of the raster data can be transferred within 208.3 μsec.

If, for example, the bus cycle is 100 nsec, the number of times of data transfer from the RAM 44 within 208.3 ìsec. will be 208.3 ìsec/100 nsec=2083. Therefore, if the bus width of the RAM 44 is 16 bits, 2083×16 bits=33,328 bits can be transferred from the RAM 44 to the ASIC 42 within 208.3 ìsec. In other words, it is determined that high speed printing is not feasible when the compressed data volume bits corresponding to the raster data having the largest compressed data volume (the greatest raster length) exceeds 33,328, whereas it is determined that high speed printing is feasible when the compressed data volume does not exceed 33,328 bits.

The raster having the largest compressed data volume (the greatest raster length) in each page to be printed can be detected by looking into the compressed image data on a raster by raster basis. Alternatively, the selection may be made by using the definition of the image size written in the page describing language or by storing the raster lengths at the time of developing image data and determining the raster having the largest compressed data volume (the greatest raster length). In the latter technique, the raster having the largest data volume (the greatest raster length) before compression is selected, which is equivalent to the selection of the greatest raster length after compression because the raster length after compression because the net result will be the same as long as the compression ratio for each raster does not vary significantly.

If it is determined in Step S5 that high speed printing is feasible (S5: YES), the processing operation proceeds to Step S6, where the CPU 41 selects "high speed" which is the requested printing speed or the highest printing speed. If, on the other hand, it is determined in Step S5 that high speed printing is not feasible (S5: NO), the processing operation proceeds to Step S7, where the CPU 41 selects "low speed" that is lower than the requested printing speed (e.g., 50% of the "high speed"). Incidentally, the "low" printing speed can be the one raster printing period which is the shortest time period necessary for transferring the compressed data that correspond to the raster having the largest compressed data volume (the greatest raster length) from the RAM 44 to ASIC 42. If such is the case, the "low" printing speed can be changed depending on each image data.

The CPU 41 generates a command signal for conveying the sheet of paper 7 at a speed that corresponds to the printing speed defined in Step S6 or S7 and outputs the command signal to the engine substrate 23. At the same time, the CPU 41 outputs an instruction to the engine substrate 23 for driving the polygon motor 17 at a rotary speed that corresponds to the printing speed.

Then, when the sensor (not shown) detects that the sheet of paper 7 reaches the printing start position, in Step S8, the CPU 41 reads the compressed image data stored in the RAM 44 on a raster by raster basis in synchronism with the rotary motion of the polygon mirror and retrieve the compressed image data into the ASIC 42. If, for example, the "low" printing speed is defined to be ½ of the "high" printing speed, the CPU 41 expands the data retrieving cycle twice as large as the data retrieving cycle for "high speed" printing. The compressed one raster image data retrieved in the ASIC 42 are then restored to the original image data upon decompression by the decompressing block 53 of the ASIC 42.

Then, in Step S9, the decompressed image data are transferred from the laser unit control block 54 to each of the laser units 8 on a raster by raster basis in synchronism with the rotary motion of the polygon mirror. Then, in Step S10, a laser beam whose intensity is modulated according to the image data is emitted from the laser beam source 16 of each of the laser units 8 so that the corresponding one of the photosensitive drums 2, 3, 4 and 5 is exposed to the laser beam to form an electrostatic latent image thereon corresponding to the one raster data. If the data given to the laser unit control block 54 at this time are multilevel-value data such as 8-bit data, the pulse width (on-time) is modulated based on the multilevel-value data before output to the related laser unit 8. Therefore, a processing operation for binarizing the multilevel-valued data is not required.

Then, in Step S11, the CPU 41 determines whether or not the processing operations of Steps S8 through S10 have been completed for all the rasters in each page. If it is determined that the processing operations have not been completed (S11: NO), the routine returns to Step S8 to repeat the above described processing operations. If, on the other hand, it is determined that the processing operations have been completed (S11: YES), a color image is formed on the sheet of paper 7 by way of the above described process.

While in the above described embodiment the operation of decompressing data in Step S8 is synchronized with the operation of driving the polygon mirror to rotate and that of transferring data to the laser units 8, the operation of decompressing data in Step S8 may alternatively be conducted without being synchronized with the above operations. In the latter case, it is only necessary that the data that have been decompressed in advance are temporarily stored in the memory controller 51 and the stored image data are transferred in synchronism with the operation of each laser unit 8 based one the instruction from the CPU 41.

Thus, according to the depicted embodiment, the printing speed of the laser engines is determined on the basis of the image data that have been compressed. Therefore, data that are compressed to a high compression ratio is available for high speed printing using a low cost RAM 44 having a relatively narrow bus width and a relatively long bus cycle. On the other hand, the data that have been compressed at a lower compression ratio can be subjected to low speed printing operations. Therefore, unsuccessful printing due to print overrun can be avoided.

In the present embodiment, judgment is made on the basis of raster data volume of the image data to be used for printing. That is, low printing speed is selected for the image data to avoid an overloaded condition of the laser printer because the transfer of the image data can take time period as a result of determination that the given amount of compressed data exceeds a predetermined level. On the other hand, high printing speed is selected for the image data because a high image data transfer operation can be performed by compressing the image data as a result of determination that the given amount of compressed data does not exceed a predetermined level. In other words, the printing speed is determined by the recording engine on the basis of the image data that have already been compressed. Consequently, a suitable printing speed can be selected.

Printing data are expressed in a page describing language and image data are raster data for the laser printer 1 of this embodiment. Therefore, image data can suitably be processed on a page by page basis. Additionally, since the printing speed of the laser engines is determined on the basis of raster data volume of the image data, the printing speed can be selected advantageously for a laser printer where print processing is performed on a raster by raster basis. Furthermore, since the printing speed is determined on a page by page basis based on the raster having the greatest raster length in the page to be printed, it is not necessary to determine the printing speed on the basis of each data volume of each raster in the image data of the page. Consequently, a processing operation prior to the actual printing operation can be carried out at high speed.

Moreover, in this embodiment, the processing operation prior to the printing operation can be simplified because only either a "high" printing speed that is the highest printing speed or the required printing speed of the laser engines or a "low" printing speed that is lower than the "high" printing speed is selected. Additionally, the printing speed of the laser printer 1 that is designed to record data on a raster by raster basis can advantageously be selected, since the "high" printing speed is the highest or the required printing speed of the laser engine and since the "predetermined length" is based on the data volume that can be transferred from the RAM 44 to the ASIC 42 within the printing time period of one raster, the time period being defined by the function of the "high" printing speed and the resolution of the laser engines.

Furthermore, since image data are transferred from the laser unit control block 54 to the laser units 8 on a raster by raster basis in synchronism with the scanning operations of the laser units 8, image data are supplied to the laser unit control block 54 on a stable basis. Accordingly, the operation of supplying data from the laser unit control block 54 to the laser units 8 is also stable and hence high definition images can be formed quickly by means of the laser scanner unit. Additionally, the CPU 41 can adopt any of the above described various compression techniques that matches the data format to be used for printing. As a result, the processing efficiency of the entire printer can be improved.

Further, since decompressed image data providing the above advantages are transferred from the laser unit control block 54 to the laser units 8, the operation of transferring image data can be conducted efficiently so that an image can be formed quickly.

Finally, since the four photosensitive drums 2, 3, 4 and 5 for the above four colors are serially arranged along the conveyance route of the sheets of paper 7 that are conveyed on the conveyor belt (conveyance section) 6, high speed color printing can be performed by transferring data simultaneously to the plurality of laser engines.

A modification to the first embodiment will be described. In the above described embodiment, the printing speed of the laser engines is determined by comparing the data volume of the raster having the largest compressed data volume among all the rasters constituting the compressed image data with a predetermined data volume (predetermined data length). In the first embodiment, the raster having the largest compressed data volume has already been selected before the comparison. In contrast, according to the modification, the data volume of each of all the rasters constituting the image data is compared with a predetermined data volume and, if there is a raster whose data volume exceeds the predetermined data volume, low speed printing is determined with respect to the image data of the page. On the other hand, if there is no raster whose data volume exceeds the predetermined data volume, high speed printing is determined with respect to the image data of the page. With this arrangement, the data volume of all the rasters constituting the image data may be compared with a predetermined data volume or, alternatively, the data volume of each of all the rasters may be compared with a predetermined data volume on a one by one basis and the comparing operation may be terminated at the time when there is found a raster whose data volume exceeds the predetermined data volume. This modified embodiment provides the advantages the same as those of the first embodiment.

A laser printer according to a second embodiment of the present invention will next be described. Since the mechanical structure of the laser printer of this embodiment is approximately the same as the laser printer 1 of the first embodiment, it will not be described in detail any further. The components of the laser printer of the second embodiment that correspond to their counterparts of the laser printer of the first embodiment are denoted respectively by the same reference symbols.

The laser printer of this embodiment differs from the laser printer 1 of the first embodiment in terms of the timing at which the CPU 41 determines the printing speed of the laser engines and in terms of the determination process. In the first embodiment the printing speed is determined on the basis of the compressed image data to be used for printing, whereas in the second embodiment the printing speed is determined on the basis of the image data before compression. More specifically, in a first step, the CPU 41 determines whether or not the data volume of the raster having the largest data volume (the greatest raster length) of a page of image data that are stored in the RAM 44 and that have not been compressed exceeds a preliminary predetermined data volume, or a preliminary predetermined data length. In only a case where the data volume of the raster having the largest data volume before compression (the greatest raster length) exceeds the predetermined data volume, a second process is executed such that the CPU 41 determines whether or not the largest data volume stored in the RAM 44 and subjected to compression can be transferred from the RAM 44 to the ASIC 42 for high speed printing in synchronism with the rotary motion of the polygon mirror on a basis of the compression ratio predicted from an entropy of the image data. Note that the preliminary predetermined data volume or preliminary predetermined length necessary for the preliminary judgment corresponds to a first predetermined data volume.

In the second step, with respect to the raster having the largest data volume (the greatest raster length) of all the rasters constituting the image data of a page before compression, the CPU 41 determines whether or not the compressed data volume exceeds a main judgment predetermined data volume, the compressed data volume being obtained as a result of compression of the raster having the largest data volume with a compression ratio that can be predicted from the entropy of the image data. If the determination falls that the compressed data volume exceeds the main judgment predetermined data volume, the CPU 41 selects the "low" printing speed of the laser engines for the image data. If, on the other hand, determination falls that the compressed data volume does not exceed the main judgment predetermined data volume, the CPU selects the "high" printing speed of the laser engines for the image data. In other words, the CPU 41 functions as printing speed determining means.

In this way, the printing speed of the laser engines is determined to be the "high" printing speed that is equal to the requested printing speed or the highest printing speed only when the requirement of the first step or that of the second step is met, whereas it is determined to be the "low" printing speed that is lower than the requested printing speed or the highest printing speed in all other cases. Incidentally, the main judgment predetermined data volume is determined on the basis of the data volume that can be transferred from the RAM 44 to the ASIC 42 within the printing time period for printing one raster, the time period being defined with a function of the "high" printing speed and the resolution of the laser engines. Further, the preliminary judgment predetermined data volume is made small enough to avoid an overloaded condition of the laser printer. The main judgment predetermined data volume or the main judgment predetermined data length corresponds to a second predetermined data volume.

Entropy of image data used herein is defined as follows. If the probability of appearance of a pixel with a given gradation level "i" is "Pi", the amount of information "I" on the pixel is expressed by the formula below.

$$I = \log_2(1/Pi) = -\log_2(Pi) \text{ bits}$$

If the total number of pixels in image data is "N" and the number of pixels with the gradation level "i" is "Ni", the following equation is available:

$$Pi = Ni/N.$$

Therefore, the entropy (average quantity of information) "H" of the image data is expressed by the formula below.

$$H = -\Sigma Pi \log_2(Pi)$$

Figure 6:
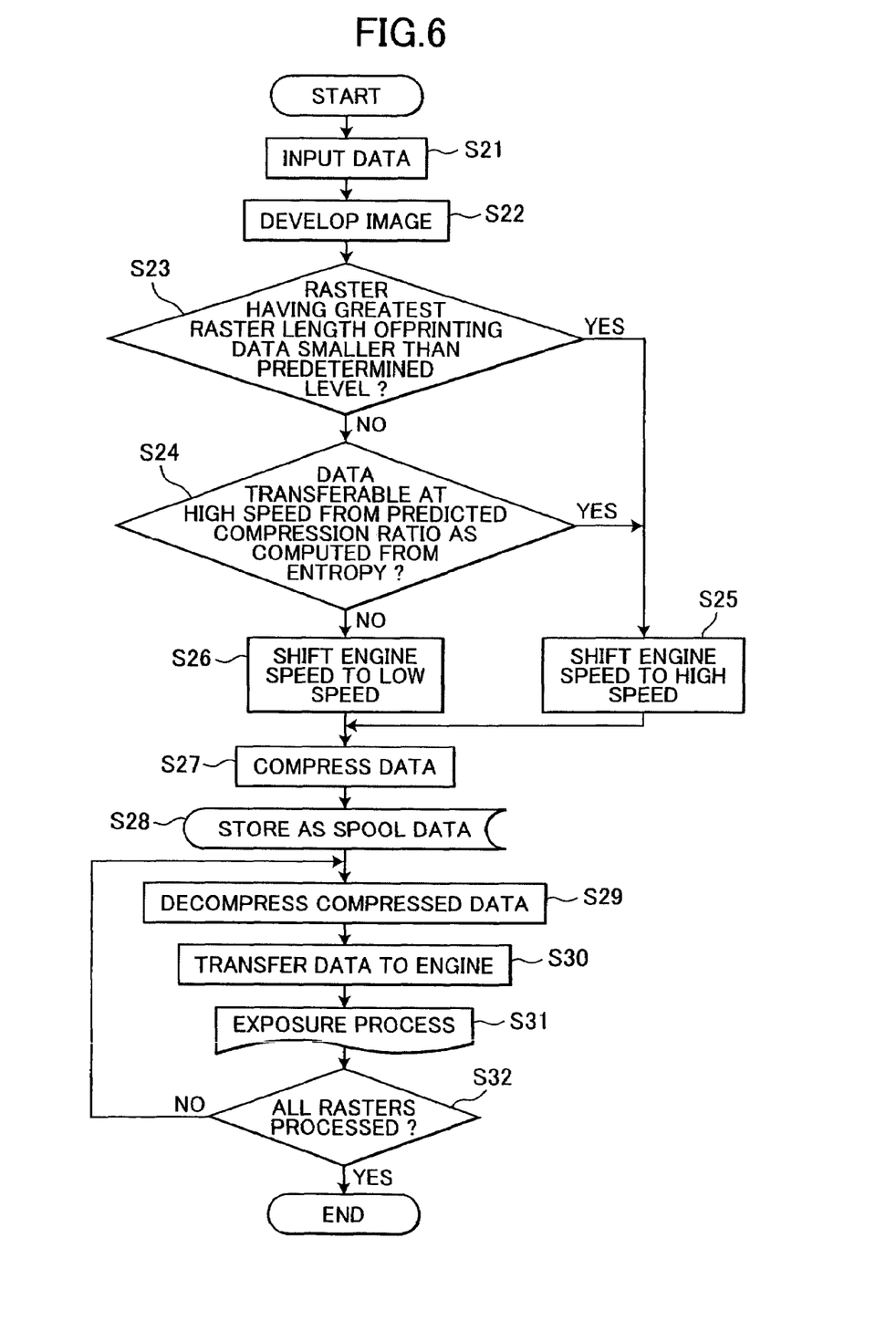
FIG. 6 is a flow chart for description of operation of a laser printer according to a second embodiment of the present invention.

Next, the operation of the laser printer 1 according to the second embodiment will be described with reference to the flowchart of FIG. 6. First, in Step S21, printing data are transmitted from the host computer to the main substrate 22 by way of the parallel I/F 22a. Then, the printing data are given to the ASIC 42 and stored in the RAM 44 by the memory controller 51.

Then in Step S23, the CPU 41 determines whether or not the data volume of the raster having the largest data volume (the greatest raster length) of each page of the image data that are not compressed but stored in the RAM 44 is not greater than the preliminary judgment predetermined data volume. Note that the preliminary judgment predetermined data volume provides a volume of the raster having the largest data volume (the greatest raster length) that can be transferred with a wide margin from the RAM 44 to the ASIC 42 in synchronism with the rotary motion of the polygon mirror that corresponds to the high printing speed even when transferred raster data have been compressed with the worst (the lowest) compression ratio.

If it is determined in Step S23 that the data volume of the raster having the largest data volume (the greatest raster length) of each page of the image data exceeds the preliminary judgment predetermined data volume (S23: NO), the routine proceeds to Step S24 where judgment is made as to whether or not the non-compressed image data stored in the RAM 44 is available for high speed printing. In other words, the CPU 41 determines whether or not the image data can be transferred from the RAM 44 to the ASIC 42 in synchronism with the rotary motion of the polygon mirror for high speed printing by comparing the data volume of the raster having the largest data volume among all rasters constituting the image data of a page with the main judgment predetermined data volume. In this case, the non-compressed raster having the largest data volume is assumed to be compressed with the compression ratio that is predictable from the entropy of the image data for transmission from the RAM 44 to the ASIC 42. The entropy of the image data is computed for each raster or each page by using the above-described formula. The entropy computation can be performed at high speed when the ASIC 42 performs the computation. The judgment of Step S24 is made only for the raster having the largest data volume (the greatest raster length).

If in Step S23 the judgment falls that the data volume of the raster having the largest data volume (the greatest raster length) is not greater than the preliminary judgment predetermined data volume (S23: YES), or it is determined in Step S24 that high speed printing is feasible (S24: YES), the routine proceeds to Step S25 where selected is "high" printing speed that is equal to the requested printing speed or the highest printing speed of the laser engines.

On the other hand, if it is determined in Step S24 that high speed printing is not feasible (S24: NO), the routine proceeds to Step S26 where selected is the "low" printing speed that is lower than the requested printing speed or the highest printing speed of the laser engines (e.g., ½ of the "high" printing speed). In other words, high speed printing can still be applied for the image data even if the data volume of the raster having the largest data volume (the greatest raster length) is greater than the preliminary judgment predetermined data volume, as long as a low entropy level and a high compression ratio are predicable with respect to the raster. As a two-step judgment (S23 and S24) are performed in this way, it is no longer necessary to perform arithmetic operations for predicting the compression ratio on the basis of entropy for image data whose data volume of the raster having the largest data volume (the greatest raster length) of each page is sufficiently smaller than the preliminary judgment predetermined data volume. Thus, a precedent print processing operation can be carried out at high speed because the laser printer can get rid of the heavy load of predicting printer can get rid of the heavy load of predicting the compression ratio by computation regarding the image data having the smaller data volume.

Subsequently, in Step S27, the image data obtained by the developing operation with the CPU 41 are compressed in the compression block 52 of the ASIC 42 by means of the above described compression technique. Then, in Step S28, the compressed image data are stored in the RAM 44 as SPOOL (simultaneous peripheral operation on-line) data.

Then, the CPU 41 generates a command signal for conveying the sheet of paper 7 at a speed that corresponds to the printing speed defined in Step S25 or S26 and outputs the command signal to the engine substrate 23. At the same time, the CPU 41 outputs an instruction to the engine substrate 23 for driving the polygon motor 17 at a rotary speed that corresponds to the printing speed.

Then, when the sensor (not shown) detects that the sheet of paper 7 reaches the printing start position, in Step S29, the CPU 41 reads the compressed image data stored in the RAM 44 on a raster by raster basis in synchronism with the rotary motion of the polygon mirror and retrieve the compressed image data into the ASIC 42. The compressed one raster image data retrieved in the ASIC 42 are then restored to the original image data upon decompression by the decompressing block 53 of the ASIC 42.

Then, in Step S30, the decompressed image data are transferred from the laser unit control block 54 to each of the laser units 8 on a raster by raster basis in synchronism with the rotary motion of the polygon mirror. Then, in Step S31, a laser beam whose intensity is modulated according to the image data is emitted from the laser beam source 16 of each of the laser units 8 so that the corresponding one of the photosensitive drums 2, 3, 4 and 5 is exposed to the laser beam to form an electrostatic latent image thereon corresponding to the one raster data.

Then, in Step S31, the CPU 41 determines whether or not the processing operations of Steps S29 through S31 have been completed for all the rasters in each page. If it is determined that the processing operations have not been completed (S31: NO), the routine returns to Step S29 to repeat the above described processing operations. If, on the other hand, it is determined that the processing operations have been completed (S31: YES), a color image is formed on the sheet of paper 7 by way of the above described process. Incidentally, in this embodiment, the data decompressing operation of Step S29 may be performed out of synchronism with the rotary motion of the polygon mirror and with the data transfer operation to the laser units 8.

In this way, since the printing speed of the laser engines is determined on the basis of non-compressed image data in this embodiment, it is possible to realize high speed printing at low cost by using a low cost RAM 44 having a relatively narrow bus width and a relatively prolonged bus cycle as long as a high compression ratio is predictable with respect to the image data. On the other hand, low speed printing can be selected in order to avoid an overloaded condition of the laser printer as a result of the prediction that a high compression ratio is not feasible for the image data.

Further, suitable printing speed can be determined because the compression ratio can be predicted at high accuracy from the entropy of image data. Particularly, in this embodiment, the printing speed of the laser engines can be altered suitably because the printing speed can be determined by using the entropy of image data and the data volume of a raster of image data. Furthermore, precedent print processing operation can be performed at high speed since arithmetic operations which impose a heavy load on the laser printer is not required. In other words, heavy processing of determination of the printing speed based on the compression ratio predicted from the image data entropy can be eliminated, if the maximum raster data volume among one page are less than the preliminary judgment predetermined data volume. Furthermore, the printing speed can be changed easily and appropriately because the preliminary judgment predetermined data volume is made small enough to avoid an overloaded condition of the laser printer. Furthermore, when the data volume of the raster having the largest data volume (the greatest raster length) exceeds a preliminary judgment predetermined data volume and is also expected to exceed a predetermined data volume level after compression, a low speed printing is selected to avoid an overloaded condition of the laser printer because the operation of transferring the image data may be time consuming. On the other hand, if the data volume of the selected raster is not expected to exceed a predetermined data volume level after compression, a high speed printing can be selected because the operation of transferring the image data can be carried out at high speed by way of the compression. In this way, the printing speed of the laser engines can be determined suitably and appropriately on the basis of the entropy of image data and the data volume of a selected raster of image data. Moreover, the second embodiment provides the remaining advantages the same as those of the first embodiment.

Incidentally, the second embodiment can be modified in a manner similar to the modification to the first embodiment. In the second embodiment, the printing speed of the laser engines is determined by comparing the predicted data volume of the raster having the largest compressed data volume among all the rasters constituting the compressed image data with the main judgment predetermined data volume, the predicted data volume being a compressed data predicted from the entropy in S24. In the second embodiment, the raster having the largest predicted compressed data volume has already been selected before the comparison. In contrast, according to the modification, the data volume of each of all the rasters constituting the image data is compared, by one raster by one raster basis, with the main predetermined data volume and, if there is a raster whose predicted compressed data volume exceeds the main predetermined data volume, low speed printing is determined with respect to the image data of the page. On the other hand, if there is no raster whose predicted compressed data volume exceeds the main predetermined data volume, high speed printing is determined with respect to the image data of the page. With this arrangement, the data volume of all the rasters constituting the image data may be compared with the main predetermined data volume or, alternatively, the data volume of each of all the rasters may be compared with the main predetermined data volume on a one by one basis and the comparing operation may be terminated at the time when there is found a raster whose predicted compressed data volume exceeds the main predetermined data volume. Not only Step S24 but also Step S23 may be applied to this modified embodiment. Thus, this modified embodiment provides the advantages similar to those of the foregoing embodiments.

While the invention has been described in detail and with reference to specific embodiments thereof, it would be apparent to those skilled in the art that various changes and modifications may be made therein without departing from the scope of the invention. For instance, while two different speeds of "high speed" and "low speed" are defined for printing speed in each of the above described embodiments, the printing speed may be changed steplessly or continuously depending on the raster having the largest data volume (the greatest raster length) in each page of image data if the print engines provides its performance capable of realizing the continuous speed change.

Further in the second embodiment, the judgment on printing speed may be made simply with Step S24 omitting Step S23. In the latter case, although the load of arithmetic operations may be increased because the compression ratio needs to be predicted from entropy for all the image data, the latter case can provide the advantages similar to the second embodiment. Alternatively, in the second embodiment, the judgment on printing speed may be made exclusively by the Step S23 omitting Step S24.

Further, in the second embodiment, the data volume of the raster having the largest data volume of all the rasters constituting the image data of a page before compression is selected, and then comparison is made in S24 between the main predetermined data volume and the raster data having the largest data volume and compressed with the compression ratio that is predictable from the entropy of the image date. Alternatively, a comparison can be made between the compression ratio predictable from the entropy of the image data and a predetermined compression judgment level.

Further, in the second embodiment, that the data volume (the raster length) obtained by compressing each raster with the compression ratio predictable from the entropy is compared with a predetermined data volume (a predetermined raster length). However, the predictable compression ratio can be compared with a predetermined compression ratio provisionally set. In the latter case, if the largest data volume of a raster is 38,400 bits and the possible maximum data transfer amount between the RAM 44 and the ASIC 42 is 33,328 bits as described above, the predetermined compression ratio of 0.86 can be derived from the equation 33,328 bits/38,400 bits=0.8679. Thus, if the predictable compression ratio predictable from the entropy exceeds 0.86, the data transfer cannot be performed in time when high speed printing is selected. Thus, the printing speed will be switched to low speed printing speed.

Further, while color laser printers are used in the above-described embodiments, the present invention is also available for monochromatic printers. Further, the color printer are not limited to the tandem type printer. Moreover, the present invention is also applicable to printers that do not employ laser engines as recording engines image, and the present invention can be applied to various image forming device such as a facsimile and a copying machine. Furthermore, image forming speed can be determined on the basis of attributes of image data other than the data volume or the raster length of a selected raster of image data. Furthermore, the ASIC 42 arranged on the main substrate 22 of each of the above embodiments may not be a requisite element if the CPU 41 takes the compressing function and the decompressing function.

What is claimed is:

1. An image forming device comprising:
   image data generation means for generating image data from original data;
   compression means for compressing the image data generated by the image data generation means;
   a printing engine providing a plurality of different printing speed for printing an image on an image recording medium;
   printing speed determining means for predicting compressed data volume based on an entropy of the image data generated by the image data generation means and selecting one of the printing speed among the plurality of different printing speed based on the predicted compressed data volume;
   memory means for storing the image data compressed by the compression means;
   decompressing means for decompressing the compressed image data stored in the memory means; and
   transfer means for transferring the image data decompressed by the decompressing means to the printing engine.

2. The image forming device as claimed in claim 1, wherein the original data comprise data expressed in a page describing language, and the image data comprise raster data.

3. The image forming device as claimed in claim 2, wherein the printing speed determining means determines the printing speed of the printing engine based on the data volume of each raster of the image data to be printed.

4. The image forming device as claimed in claim 3, wherein the recording engine provides at least a first printing speed and a second printing speed lower than the first printing speed, and
   the printing speed determining means comprises:
   a selection means for selecting one specific raster having the largest data volume among all rasters constituting the image data to be printed, the one specific raster providing the largest data volume after compression upon prediction from an entropy of the image data; and
   judging means for judging whether or not the data volume of the selected raster exceeds a predetermined data volume and for determining the second printing speed for the image data if the data volume of the specific raster exceeds the predetermined data volume, and for determining the first printing speed for the image data if the data volume of the selected raster does not exceed the predetermined data volume.

5. The image forming device as claimed in claim 4, wherein the printing speed determining means selects out the raster having the largest data volume based on non-compressed image data.

6. The image forming device as claimed in claim 3, wherein the printing speed determining means determines the printing speed based on a first data volume of each raster of the image data to be printed and based on a second data volume of each raster, the second data volume being compressed by way of prediction from the entropy.

7. The image forming device as claimed in claim 6, wherein the printing engine provides at least a first printing speed, and a second printing speed lower than the first printing speed; and the printing speed determining means comprises:
a first selection means for selecting out one specific non-compressed raster having the largest data volume among all non-compressed rasters constituting the image data to be recorded,
a first judging means for judging whether or not a first data volume of the selected non-compressed specific raster exceeds a first predetermined data volume and for determining the first printing speed for the image data if first data volume of the selected non-compressed specific raster does not exceed the first predetermined data volume;
a converting means for converting the selected non-compressed specific raster into a compressed specific raster compressed with a compression ratio predicted from an entropy of the image data, the compressed specific raster having a second data volume;
a second judging means for judging whether or not the second data volume exceeds a second predetermined data volume, and for determining the first printing speed for the image data if second data volume does not exceed the second predetermined data volume, and for determining the second printing speed for the image data if the second data volume exceeds the second predetermined data volume.

8. The image forming device as claimed in claim 6, wherein the printing engine provides at least a first printing speed, and a second printing speed lower than the first printing speed; and the printing speed determining means comprises:
a first selection means for selecting out one specific non-compressed raster having the largest data volume among all non-compressed rasters constituting the image data to be recorded,
a first judging means for judging whether or not a first data volume of the selected non-compressed specific raster exceeds a first predetermined data volume and for determining the first printing speed for the image data if first data volume of the selected non-compressed specific raster does not exceed the first predetermined data volume;
a second selection means for selecting out a raster having the largest data volume among all rasters as a result of compression of these rasters with a compression ratio predicted from an entropy of the image data, the compressed raster having the largest data volume providing a second data volume;
a second judging means for judging whether or not the second data volume exceeds a second predetermined data volume, and for determining the first printing speed for the image data if the second data volume does not exceed the second predetermined data volume, and for determining the second printing speed for the image data if the second data volume exceeds the second predetermined data volume.

9. The image forming device as claimed in claim 3, wherein the printing engine provides least at a first printing speed and a second printing speed lower than the first printing speed; and wherein printing speed determining means comprises:
judging means for judging on raster-by-raster basis whether or not each data volume of each raster after compression as a result of prediction from an entropy of the image data to be recorded exceeds a predetermined data volume; and
determining means for determining the second speed for the image data if there is a raster whose data volume exceeds the predetermined data volume, and for determining the first printing speed for the image data if there is not any raster whose data volume exceeds the predetermined data volume.

10. The image forming device as claimed in claim 6, wherein the printing engine provides at least a first printing speed and a second printing speed lower than the first printing speed, and wherein the printing speed determining means comprises:
first judging means for judging on raster-by-raster basis whether or not each data volume of each non-compressed raster constituting the image data to be recorded exceeds a first predetermined data volume and for determining the first speed for the image data if there is not any raster whose data volume exceeds the first predetermined data volume;
second judging means for judging on raster-by-raster basis whether or not each data volume of each raster after compression as a result of prediction from an entropy of the image data exceeds a second predetermined data volume; and
determining means for determining the second speed for the image data if there is a raster whose data volume exceeds the second predetermined data volume, and for determining the first speed for the image data if there is not any raster whose data volume exceeds the second predetermined data volume.

11. The image forming device as claimed in claim 3, wherein the printing engine provides at least a first printing speed and a second printing speed lower than the first printing speed, and wherein the first printing speed is one of a requested printing speed and a maximum printing speed of the printing engine, and wherein the predetermined data volume is determined based on a data volume transferable from the memory means to the decompressing means within a printing time period for one raster the printing period being determined with a function of the first printing speed and a resolution of the printing engine.

12. The image forming device as claimed in claim 1, wherein the printing speed determining means determines the printing speed of the printing engine on a page by page basis.

13. The image forming device as claimed in claim 1, wherein image data generated by the image data generation means comprise color data for performing color image printing based on the color data.

14. The image forming device as claimed in claim 1, wherein the printing engine comprises a conveyance section for conveying the image recording medium along a conveying route, a photosensitive body, an exposure section for forming an electrostatic latent image on the photosensitive body, a developing unit for developing the electrostatic latent image on the photosensitive body, and a drive means for driving the conveyance section, the photosensitive body, the exposure section, and a developing unit, and wherein the transfer means transfers image data decompressed by the decompressing means to the exposure section.

15. The image forming device as claimed in claim 14, wherein a plurality of combinations each including the photosensitive body, the exposure section, and the developing unit are arranged along the conveyance route for every color different from each other.

16. The image forming device as claimed in claim 3, wherein the printing engine comprises a laser engine including a laser scanner unit performing the scanning operation, the data of the raster being transferred from the transfer means to the laser engine on a raster-by-raster basis in synchronism with the scanning operation.

17. The image forming device as claimed in claim 1, wherein the compression means compresses image data through one of run length coding, prediction coding, JBIG, bit plane conversion, prediction coding, block sorting, JPEG using a non-reversible compression DCT method, and wavelet conversion.

18. The image forming device as claimed in claim 3, wherein the entropy of the image data is represented by the following formula:

$$H = -\Sigma Pi \log_2 (Pi), \text{ where } Pi = Ni/N$$

in which:
- H: entropy of the image data,
- Pi: probability of appearance of a pixel with a given gradation level "i,"
- Ni: the number of pixels with the gradation level "i," and
- N: total number of pixels in the image data.

19. An image forming method comprising the steps of:
generating image data from original data;
predicting data volume of the image data as if the image data being compressed based on an entropy of the image data generated in the generation step;
determining printing speed of a printing engine based on the predicted data volume among a plurality of printing speed;
compressing the image data generated in the image data generation step;
storing the image data compressed in the compression step into a memory section;
decompressing the compressed image data stored in the memory section; and
transferring the image data decompressed in the decompressing step to the printing engine.

* * * * *